(12) United States Patent
Tomita et al.

(10) Patent No.: US 8,092,624 B2
(45) Date of Patent: *Jan. 10, 2012

(54) BONDING MATERIAL COMPOSITION AND METHOD FOR MANUFACTURING THE SAME, AND JOINED BODY AND METHOD FOR MANUFACTURING THE SAME

(75) Inventors: Takahiro Tomita, Chita (JP); Kenji Morimoto, Kasugai (JP); Katsuhiro Inoue, Ama-County (JP); Masaaki Kawai, Nishikasugai-County (JP); Suguru Kodama, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 904 days.

This patent is subject to a terminal disclaimer.

(21) Appl. No.: 11/951,682

(22) Filed: Dec. 6, 2007

(65) Prior Publication Data
US 2008/0138568 A1 Jun. 12, 2008

(30) Foreign Application Priority Data

Dec. 7, 2006 (JP) .................. 2006-330510
Oct. 29, 2007 (JP) .................. 2007-280677

(51) Int. Cl.
*B32B 3/12* (2006.01)
*B28B 1/30* (2006.01)
*B29B 65/00* (2006.01)
*B29B 7/00* (2006.01)
*B31B 1/62* (2006.01)
*C04B 37/00* (2006.01)

(52) U.S. Cl. ........ 156/60; 264/630; 428/116; 156/89.22

(58) Field of Classification Search .......... None
See application file for complete search history.

(56) References Cited

U.S. PATENT DOCUMENTS

| | | | | |
|---|---|---|---|---|
| 2,637,675 A | * | 5/1953 | Bain | 428/477.7 |
| 2,933,552 A | * | 4/1960 | Schurecht | 174/152 S |
| 4,090,881 A | * | 5/1978 | Keel et al. | 501/95.1 |
| 5,547,749 A | * | 8/1996 | Chiba et al. | 428/323 |
| 5,914,187 A | * | 6/1999 | Naruse et al. | 428/327 |
| 6,669,751 B1 | * | 12/2003 | Ohno et al. | 55/523 |
| 7,138,168 B2 | | 11/2006 | Fujita | |
| 2002/0197193 A1 | | 12/2002 | Harada et al. | |

(Continued)

FOREIGN PATENT DOCUMENTS

EP 0 965 735 A2 12/1999

(Continued)

OTHER PUBLICATIONS

Shimomura et al. (Journal of Materials Science, 30 (1995) 3193-3199).*

(Continued)

*Primary Examiner* — David Sample
*Assistant Examiner* — Nicole T Gugliotta
(74) *Attorney, Agent, or Firm* — Oliff & Berridge, PLC

(57) ABSTRACT

There is provided a bonding material composition for obtaining a joined body by unitarily joining two or more members to be joined by means of a bonding material layer, wherein the bonding material composition contains flat particles, non-flat particles, smectite-based clay, and an inorganic adhesive as main components. The bonding material composition costs little, can relax thermal stress generated in the joined body without using fibers which may do harm to a human body, and can reduce defects such as a crack and a void upon drying or a thermal treatment.

23 Claims, 3 Drawing Sheets

U.S. PATENT DOCUMENTS

| | | | |
|---|---|---|---|
| 2004/0045267 A1 | 3/2004 | Ichikawa et al. | |
| 2004/0097370 A1 | 5/2004 | Ichikawa et al. | |
| 2004/0144962 A1* | 7/2004 | Hayakawa et al. | 252/500 |
| 2005/0011174 A1* | 1/2005 | Hong et al. | 55/523 |
| 2005/0076626 A1* | 4/2005 | Kudo et al. | 55/523 |
| 2005/0079975 A1 | 4/2005 | Fujita | |
| 2005/0109023 A1* | 5/2005 | Kudo et al. | 60/311 |
| 2005/0221053 A1 | 10/2005 | Tomita et al. | |
| 2005/0255288 A1* | 11/2005 | Noguchi et al. | 428/116 |
| 2006/0150597 A1 | 7/2006 | Masukawa et al. | |
| 2006/0166820 A1* | 7/2006 | Ogyu et al. | 502/439 |
| 2006/0216466 A1 | 9/2006 | Yoshida | |
| 2006/0216467 A1* | 9/2006 | Yoshida | 428/116 |
| 2006/0228520 A1* | 10/2006 | Masukawa et al. | 428/116 |
| 2006/0230732 A1 | 10/2006 | Kunieda | |
| 2006/0290036 A1* | 12/2006 | Kaneda et al. | 264/628 |
| 2007/0039298 A1 | 2/2007 | Tokumaru | |
| 2007/0092692 A1* | 4/2007 | Masukawa et al. | 428/116 |
| 2007/0160825 A1* | 7/2007 | Miyakawa et al. | 428/312.2 |
| 2008/0138568 A1 | 6/2008 | Tomita et al. | |
| 2008/0152863 A1* | 6/2008 | Tomita et al. | 428/116 |
| 2008/0248238 A1* | 10/2008 | Tomita et al. | 428/116 |
| 2009/0022943 A1 | 1/2009 | Tomita et al. | |
| 2009/0041975 A1* | 2/2009 | Kodama et al. | 428/116 |
| 2009/0202779 A1 | 8/2009 | Yoshida | |

FOREIGN PATENT DOCUMENTS

| | | |
|---|---|---|
| EP | 1 142 619 A1 | 10/2001 |
| EP | 1 452 511 A1 | 9/2004 |
| EP | 1 479 882 A1 | 11/2004 |
| EP | 1 508 355 A1 | 2/2005 |
| EP | 1 508 356 A1 | 2/2005 |
| EP | 1 508 357 A1 | 2/2005 |
| EP | 1 508 358 A1 | 2/2005 |
| EP | 1 612 197 A1 | 1/2006 |
| EP | 1 964 823 A1 | 9/2008 |
| JP | B2-3121497 | 12/2000 |
| JP | A-2001-162119 | 6/2001 |
| JP | A-2001-190916 | 7/2001 |
| JP | A 2002-177719 | 6/2002 |
| JP | A-2004-283669 | 10/2004 |
| JP | A-2005-154202 | 6/2005 |
| KR | 2006-84403 A | 7/2006 |
| KR | 2006-93106 A | 8/2006 |
| WO | WO 03/048072 A1 | 6/2003 |
| WO | WO 03/067041 A1 | 8/2003 |
| WO | WO 03/067042 A1 | 8/2003 |
| WO | WO 2005/030364 A1 | 4/2005 |
| WO | WO 2007/111279 A1 | 10/2005 |
| WO | WO 2006/075805 A1 | 7/2006 |
| WO | WO 2006/103786 A1 | 10/2006 |
| WO | WO 2007/116665 A1 | 10/2007 |

OTHER PUBLICATIONS

Feb. 2, 2011 European Search Report issued in EP 07 25 4730.
Aug. 6, 2010 Office Action issued in U.S. Appl. No. 11/962,965.
Jan. 7, 2011 Office Action issued in U.S. Appl. No. 11/962,965.
Xanthos, Functional Fillers for Plastics, 2010, Wiley-Vch (Publisher), $2^{nd}$ edition, pp. 22-23.
MNX: http://www.memsnet.org/materials/siliconcarbidesic/ (Nov. 21, 2001).
Ciullo, Peter A., Industrial Minerals and Their Uses: A Handbook and Formulary, 1996, Noyes Publications, p. 343.
Mar. 22, 2010 Office Action issued in U.S. Appl. No. 12/239,343.
Sep. 17, 2010 Office Action issued in U.S. Appl. No. 12/239,343.
Apr. 29, 2010 Extended European Search Report issued in European Patent Application No. EP 07739550.7.
Mar. 3, 2011 Office Action issued in U.S. Appl. No. 12/138,076.
Feb. 23, 2010 Office Action issued in U.S. Appl. No. 12/138,076.
Sep. 17, 2010 Office Action issued in U.S. Appl. No. 12/138,076.
Mar. 4, 2011 Office Action issued in U.S. Appl. No. 12/235,379.

* cited by examiner

BONDING MATERIAL COMPOSITION AND METHOD FOR MANUFACTURING THE SAME, AND JOINED BODY AND METHOD FOR MANUFACTURING THE SAME

BACKGROUND OF THE INVENTION AND RELATED ART STATEMENT

The present invention relates to a bonding material composition used for unitarily joining a plurality of members such as honeycomb segments constituting a honeycomb structure, a joined body integrated with the bonding material composition, a method for manufacturing the bonding material composition, and a method for manufacturing the joined body using the bonding material composition.

A honeycomb structure is widely used as a trapping filter for exhaust gas, for example, a diesel particulate filter (DPF) for trapping and removing particulate matter contained in exhaust gas from a diesel engine or the like.

Such a honeycomb structure has a structure having a numerous number of cells which functions as fluid passages, and are defined by porous partition walls of, for example, silicon carbide (SiC) are disposed in parallel with one another. Further, end portions of adjacent cells are alternately plugged like in a checkered pattern. That is, for example, one end portion of a cell at one side is open and another end portion thereof is plugged, and the end portion of another cell adjacent to the open end portion of the above-mentioned cell is plugged, but the other end portion of the another cell is open.

Such a structure enables exhaust gas to be purified by allowing exhaust gas to flow into predetermined cells (inflow cells) from one end, to pass through porous partition walls, and to be discharged from the cells adjacent to the inflow cells (outflow cells) in order to trap particulate matter in exhaust gas with the partition walls when the exhaust gas passes through the partition walls.

In order to use such a honeycomb structure (filter) continuously for a long period of time, it is necessary to regularly subject the filter to a regeneration treatment. That is, in order to reduce a pressure loss increased by particulate matter accumulated in the filter with the lapse of time to put the filtering performance in the initial state, it is required to remove the particulate matter accumulated in the filter by combustion. However, there is a problem of causing defects such as cracks or breakages in a honeycomb structure due to large thermal stress generated at the time of regeneration of a filter. In order to cope with the demand for improvement of thermal shock resistance against the thermal stress, there has been proposed a honeycomb structure having a segmented structure imparting a function of dispersing and relaxing the thermal stress by unitarily joining a plurality of honeycomb segments with a bonding material layer. Thus, the thermal shock resistance could be improved to some extent.

However, a demand for further enlargement of a filter has been increasing in recent years, and thermal stress generated upon regeneration has been increasing due to this tendency. Therefore, in order to solve the above problem, further improvement in thermal shock resistance as a structure has strongly been desired. In order to realize the improvement in thermal shock resistance, a bonding material layer for unitarily joining a plurality of honeycomb segments is required to have excellent stress-relaxing function and bonding strength.

There has conventionally been disclosed a ceramic structure formed by unitarily joining a plurality of honeycomb segments with a sealing agent containing at least inorganic fibers, an organic binder, an inorganic binder, and inorganic particles, the inorganic fibers having an orientation of 70% or more (see JP-A-2002-177719).

In such a ceramic structure, an effect of inhibiting a filter (ceramic structure) from expanding and contracting can be obtained by using a sealing agent (bonding material composition) as described above, and thermal stress applied on the filter can be released even under severe use conditions. However, in the case that the bonding material composition contains orientated inorganic fibers as described above, high thermal stress generates because of the high tensile Young's modulus (elastic modulus measured by tensile test) while the compressive Young's modulus (elastic modulus measured by compression test) in the thickness direction of the bonding material layer is low. In addition, in the case that members to be joined are joined with orientating fibers in one direction in the bonding material composition, expansion and contraction of the bonding material composition upon drying or a thermal treatment is different between the direction of the orientation and the direction perpendicular to the orientation of the fibers, which is prone to cause defects such as cracks and voids.

Further, in case of the sealing agent disclosed in JP-A-2002-177719, there is a problem that the cost should unavoidably increase since it is ceramic cement which requires the control of the characteristics thereof by regulating the diameter or length of fibers functioning as filler. Furthermore, since the sealing agent employs fibers as filler for the ceramic cement, there might be a potential risk to a human body due to the use of fibers.

SUMMARY OF THE INVENTION

The present invention has been made in view of the aforementioned problems of conventional art and mainly aims to provide a bonding material composition capable of relaxing thermal stress generating in a joined body and capable of reducing generation of defects such as a crack and a void upon drying or a thermal treatment.

In order to achieve the above aim, according to the present invention, there is provided the following bonding material composition, joined body, method for manufacturing the bonding material composition, and method for manufacturing the joined body.

[1] A bonding material composition for obtaining a joined body by unitarily joining two or more members to be joined by means of a bonding material layer, wherein the bonding material composition contains flat particles, non-flat particles, smectite-based clay, and an inorganic adhesive as main components.

[2] A bonding material composition according to [1], wherein the bonding material composition contains 12 to 38% by mass of the flat particles with respect to the total amount of the main components.

[3] A bonding material composition according to [1] or [2], wherein the bonding material composition contains 0.1 to 5% by mass of the smectite-based clay with respect to the total amount of the main components.

[4] A bonding material composition according to [1] to [3], wherein the non-flat particles contained the bonding material composition comprise non-flat particles A having an average particle diameter of 10 μm or more non-flat particles B having an average particle diameter of below 10 μm and wherein the bonding material composition contains 30 to 50% by mass of the non-flat particles B with respect to the total amount of the main components.

[5] A bonding material composition according to [1] to [4], wherein the bonding material composition contains an organic binder, a dispersant, a resin balloon, and water as auxiliary components.

[6] A bonding material composition according to [1] to [5], wherein the flat particles have an aspect ratio of 3 or more.

[7] A bonding material composition according to [1] to [6], wherein the flat particles have an average particle diameter of 2 to 200 μm.

[8] A bonding material composition according to [1] to [7], wherein the flat particles are formed of at least one material selected from the group constituting of mica, talc, boron nitride, and glass flakes.

[9] A bonding material composition according to [8], wherein the mica is one calcined at 800° C. or more, and the talc is one calcined at 900° or more.

[10] A bonding material composition according to anyone of [1] to [9], wherein the non-flat particles are formed of at least one material selected from the group consisting of alumina, silica, mullite, zirconia, silicon carbide, silicon nitride, aluminum nitride, and glass.

[11] A bonding material composition according to any one of [1] to [10], wherein the inorganic adhesive is of colloidal silica.

[12] A bonding material composition according to any one of [1] to [11], wherein the members are honeycomb segments.

[13] A bonding material composition according to [12], wherein honeycomb segments are to be used for obtaining a honeycomb structure as a diesel exhaust gas purification filter.

[14] A joined body formed by unitarily joining two or more members to be joined by means of a bonding material layer formed of a bonding material composition according to any one of [1] to [13], wherein the bonding material layer has a porosity of 40 to 80% and pores having a pore diameter of 200 μm or more.

[15] A joined body according to [14], wherein two members adjacent each other are bonded together by means of the bonding material layer having a thickness of t, and, when a portion of the bonding material layer from the interface between a first member of said two members and the bonding material layer to 0.25 t in a thickness direction is defined as a bonding material layer I, a portion of the bonding material layer from the interface between a second member of said two members and the bonding material layer to 0.25 t in a thickness direction is defined as a bonding material layer III, and a portion of the bonding material layer having a thickness of 0.5 t between the bonding material layer I and the bonding material layer III is defined as a bonding material layer II, an average porosity $\epsilon_1$ of the bonding material layer I and the bonding material layer II and a porosity $\epsilon_2$ of the bonding material layer II satisfy the relation of $\epsilon_2/\epsilon_1 > 1.1$.

[16] A joined body according to [14] or [15], wherein a compressive Young's modulus in a thickness direction of the bonding material layer is 20% or less of a Young's modulus of the members to be joined.

[17] A joined body according to any one of [14] to [16], wherein, when the two members and the bonding material layer bonding the members are cut out as a test piece and subjected to a bending test of bonding portion in sample specimen, a ratio of a bending Young's modulus in the bending test of bonding portion in sample specimen to a compressive Young's modulus in a thickness direction of the bonding material layer is within the range from 0.8 to 20.

[18] A joined body according to any one of [14] to [17], wherein the bonding material layer has a thermal conductivity of 0.05 to 5 W/mK.

[19] A joined body according to any one of [14] to [18], wherein the members to be joined are honeycomb segments.

[20] A joined body according to any one of [14] to [19], wherein the joined body is used for a diesel exhaust gas purification filter.

[21] A method for manufacturing a bonding material composition, the method comprising the step of mixing and kneading a raw material containing, flat particles, non-flat particles, smectite-based clay, and an inorganic adhesive as main components to give a paste.

[22] A method for manufacturing a bonding material composition according to [21], wherein the raw material further contains an organic binder, a dispersant, a resin balloon, and water as auxiliary components.

[23] A method for manufacturing a joined body formed by unitarily joining two or more members to be joined by using a bonding composition according to any one of [1] to [13].

[24] A method for manufacturing a joined body according to Claim [23], wherein the members to be joined are honeycomb segments.

Since a bonding material composition of the present invention does not contain fibers which increase costs due to the special treatment required and might have a potential risk to a human body because of its nature, the bonding material composition can be provided at cheaper price, and it would be less risky to human being. In addition, since flat particles are used as filler instead of fibers, a compressive Young's modulus and a tensile Young's modulus in the thickness direction of the bonding material layer can be lowered to relax thermal stress generating in a joined body. Further, use of flat particles having a high aspect ratio in place of fibers relaxes directionality of contraction upon drying or a thermal treatment to cause uniform contraction in the whole bonding material composition, which can reduce generation of defects such as a crack and a void. A joined body of the present invention can be obtained by bonding a plurality of members to be joined by a bonding material composition having excellent effects as described above. In addition, since the porosity and the pore diameter of the bonding material layer are controlled to be within predetermined ranges from the viewpoint of relaxing thermal stress, the joined body has excellent thermal shock resistance and can suitably be used as, for example, a DPF honeycomb structure. According to a method for manufacturing a bonding material composition of the present invention, there can be manufactured a bonding material composition having excellent effects as described above. According to a method for manufacturing a joined body of the present invention, a joined body having excellent thermal shock resistance can be manufactured.

REFERENCE NUMERALS

Figure 1:
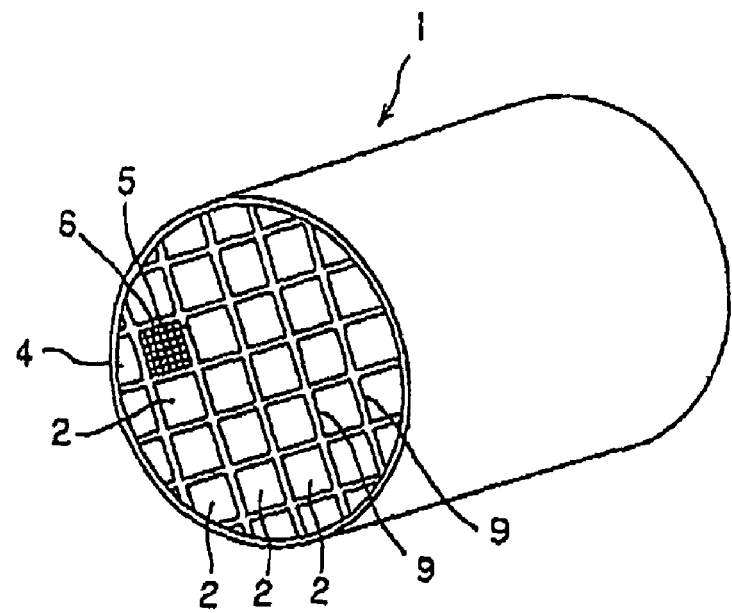
FIG. 1 is a perspective schematic view showing an example of an embodiment of a joined body (honeycomb structure) of the present invention.

1: honeycomb structure, 2: honeycomb segment, 4: coating material, 5: cell, 6: partition wall, 7: filler, 9: bonding material layer, 11: member to be joined, 13: test piece, 15: fulcrum, 17: load point

DETAILED DESCRIPTION OF THE INVENTION

The present invention will be further explained in detail with reference to the embodiments given hereinafter. However, the present invention is not construed by limiting to the embodiment, and various changes, modifications, and improvements may be added thereto based on knowledge of those skilled in the art as long as they are not deviated from the spirit of the present invention.

A bonding material composition of the present invention is for obtaining a joined body by unitarily joining two or more members to be joined by means of a bonding material layer, wherein the bonding material composition contains flat particles, non-flat particles, smectite-based clay, and an inorganic adhesive as main components. Here, "flat particles, non-flat particles, smectite-based clay, and an inorganic adhesive as main components" means that the total amount of flat particles, non-flat particles, smectite-based clay, and an inorganic adhesive is 50% by mass or more with respect to the entire amount of the bonding material composition. In addition, a "flat particle" means a particle having two or more relatively plane faces, two of the plane faces are almost parallel to each other, and a distance between the almost parallel faces is small in comparison with a longer diameter of the faces. Further, a "non-flat particle" means a massive or spherical particle having neither characteristics of the above flat particle nor characteristics regarded as a fiber-shape or a needle-shape.

The most important characteristic of the present invention lies in the use of flat particles in place of inorganic fibers which have conventionally been used as a filler for a bonding material composition. First, when a bonding material composition of the present invention is looked from a functional viewpoint, the bending Young's modulus of the joined body in a bending test of bonding portion in sample specimen can be lowered because flat particles are employed in place of fibers. This shows a low tensile Young's modulus in the thickness direction of the bonding material layer, and as a result thermal stress generating in the joined body can be relaxed. In addition, use of flat particles having a high aspect ratio in place of fibers orientated in one direction relaxes directionality of contraction upon drying or a thermal treatment to cause uniform contraction in the whole bonding material composition, which can reduce generation of defects such as a crack and a void.

Next, a bonding material composition of the present invention is examined from the viewpoint of costs. In order to control the characteristics of a bonding material composition containing fibers, it is necessary to control a diameter and length of fibers, which means the control is costly. In contrast, when flat particles are used, such a costly control is not required, which enables to provide the bonding material composition at cheap price. Furthermore, from the viewpoint of safety to a human body, fibers would not be always harmless to a human body when they are taken inside the body by breathing or the like. However, in the case of flat particles, there would be less harmful to human beings.

The bonding material composition contains preferably 12 to 38% by mass, more preferably 13 to 37% by mass, and furthermore preferably 15 to 35% by mass of the flat particles with respect to the total amount of the main components (flat particles, non-flat particles, smectite-based clay, and an inorganic adhesive) from the viewpoints of controlling the compressive Young's modulus and the tensile Young's modulus in the thickness direction of the bonding material layer and relaxing directionality of contraction upon drying or a thermal treatment. When the ratio of the flat particles is below 12% by mass of the main components, the compressive Young's modulus and the tensile Young's modulus in the thickness direction of the bonding material layer may become too high. When the ratio is above 38% by mass, directionality of contraction upon drying or a thermal treatment may not be relaxed.

The flat particles have an aspect ratio of preferably 3 or more, more preferably 5 or more, and furthermore preferably 7 or more from the viewpoint of controlling the compressive Young's modulus and a tensile Young's modulus in the thickness direction of the bonding material layer and relaxing directionality of contraction upon drying or a thermal treatment. When the aspect ratio is below 3, the compressive Young's modulus and the tensile Young's modulus in the thickness direction of the bonding material layer may become too high.

The flat particles have an average particle diameter of preferably 2 to 200 μm, more preferably 5 to 180 μm, and furthermore preferably 10 to 150 μm from the viewpoint of controlling the compressive Young's modulus and the tensile Young's modulus in the thickness direction of the bonding material layer. When the average particle diameter of the flat particles is below 2 μm, the compressive Young's modulus and the tensile Young's modulus in the thickness direction of the bonding material layer may become too high. When the average particle diameter of the flat particles is above 200 μm, directionality of contraction upon drying or a thermal treatment may not be relaxed. In the present specification, the "average particle diameter" means a value measured according to JIS R1629 regarding any of the flat particles, non-flat particles A, and one-flat particles B.

Examples of the material for the flat particles include mica, talc, boron nitride, glass flakes, and the like. In particular, mica can suitably be used. With regard to mica and talc, calcined mica or calcined talc is preferably used because thermal stability of the resultant bonding material layer is enhanced by removing a hydroxyl group in the structure in advance. Preferable mica is one calcined at 800° C. or more, and preferable talc is one calcined at 900° C. or more.

The rate of the non-flat particles contained as a filler other then the above flat particles in the bonding material composition of the present invention is preferably 30 to 70% by mass, more preferably 35 to 65% by mass, and 40 to 60% by mass of the total amount of the main components. When the rate of the non-flat particles is below 30% by mass, sufficient bonding strength may not be obtained. When the rate is above 70% by mass, the compressive Young's modulus and the tensile Young's modulus in the thickness direction of the bonding material layer may become too high. However, note that the amount of non-flat particles in the composition should be an amount sufficient to make the total amount of the composition 100% by mass when the amount of the flat particles is the lowest one among the amount specified above.

The non-flat particles are preferably composed of the non-flat particles A having an average particle diameter of 10 μm or more and the non-flat particles B having an average particle diameter of below 10 μm. In this case, the ratio of the non-flat particles B is preferably 30 to 50% by mass, more preferably 33 to 48% by mass, and furthermore preferably 35 to 45% by mass with respect to the total amount of the main components. When the non-flat particles A and the non-flat particles B with different average particle diameters are used together with the above range of the ratio of the non-flat particles B, sufficient bonding strength can easily be obtained advantageously. When the ratio of the non-flat particles B is below 30% by mass with respect to the total amount of the main components, sufficient bonding strength may not be obtained. When the ratio is above 50% by mass, the compressive Young's modulus and the tensile Young's modulus in the thickness direction of the bonding material layer may become too high.

Suitable examples of the material for the non-flat particles include alumina, silica, mullite, zirconia, silicon carbide, silicon nitride, aluminum nitride, and glass.

A ratio of the aforementioned smectite-based clay contained in a bonding material composition of the present invention is preferably 0.1 to 5% by mass, more preferably 0.15 to 4% by mass, and furthermore preferably 0.2 to 3% by mass from the viewpoints of controlling the compressive Young's modulus and the tensile Young's modulus in the thickness direction of the bonding material layer and bonding strength. When the ratio of the smectite-based clay is below 0.1% by mass with respect to the total amount of the main components, the compressive Young's modulus and the tensile Young's modulus in the thickness direction of the bonding material layer may become too high. When the ratio is above 5%, sufficient bonding strength may not be obtained. Note that the term "tensile Young's modulus" means an elastic modulus measured by tensile test according to JIS R1606, and the term "compressive Young's modulus" means an elastic modulus measured by compression test according to JIS R1608, and the term "bending Young's modulus" means an elastic modulus measured by bending test according to JIS R 1624, respectively.

Examples of the smectite-based clay (smectite mineral) suitably used as a main component of a bonding material composition of the present invention include bentonite, montmorillorite, hectorite, and saponite.

The rate of the inorganic adhesive contained as a matrix in a bonding material composition of the present invention is preferably 5 to 50% by mass, more preferably 8 to 48% by mass, and furthermore preferably 10 to 45% by mass from the viewpoints of controlling the compressive Young's modulus and the tensile Young's modulus in the thickness direction of the bonding material layer and bonding strength. When the ratio of the inorganic adhesive is below 5% by mass with respect to the total mass of the main components, sufficient bonding strength may not be obtained. When the ratio is above 50%, a compressive Young's modulus and a tensile Young's modulus in the thickness direction of the bonding material layer may become too high.

Examples of the material for the inorganic adhesive include colloidal silica (silica sol), colloidal alumina (alumina sol), other various kinds of metal oxide sols, ethyl silicate, water glass, silica polymer, and aluminum phosphate. Of these, colloidal silica is particularly preferably used because of excellent bonding force, compatibility with a filler, chemical stability, and thermal resistance.

A bonding material composition of the present invention may contain an organic binder, a dispersant, a resin balloon, and water as auxiliary components as necessary in addition to the aforementioned main components.

In a method for manufacturing a bonding material composition of the present invention, an organic binder (e.g., methyl cellulose (MC) and carboxymethyl cellulose (CMC)), a resin balloon, a dispersant, water, and the like may be added as necessary to a raw material containing, flat particles, non-flat particles, smectite-based clay, and an inorganic adhesive as main components, and they are mixed together and kneaded with a kneader such as a mixer to give a paste. Here, the term "resin balloon" means a hollow spherical material made of a resin such as polyacrylonitrile or the like.

Though the members to be joined with a bonding material composition of the present invention are not particularly limited, they are suitable for bonding ceramic members to be joined to obtain a ceramic structure. They are most suitably used for bonding honeycomb segments to obtain a honeycomb structure to be used for a diesel exhaust gas purification filter, which is exposed to a severe thermal environment upon regenerating the filter.

A joined body of the present invention is a joined body formed by unitarily joining two or more members to be joined by means of a bonding material layer formed of a bonding material composition of the present invention. The bonding material layer has a porosity of 40 to 80%, preferably 42 to 75%, and more preferably 45 to 70% and a pore diameter of 200 μm or more, preferably 250 μm or more, and more preferably 300 μm or more.

In order to relax thermal stress of a joined body, it is important to lower the Young's modulus in the thickness direction of the bonding material layer. This depends on a micro structure of the bonding material layer, particularly the porosity and pore diameter of the bonding material layer. As described above, when the bonding material has a porosity of 40 to 80% and coarse pores having a pore diameter of 200 μm or more, the Young's modulus in the thickness direction of the bonding material layer is lowered to effectively relax thermal stress. Incidentally, when the porosity of the bonding material layer is below 40%, the Young's modulus in the thickness direction of the bonding material layer is high. When the porosity is above 80%, sufficient bonding strength may not be obtained. When the bonding material layer does not have coarse pores having a pore diameter of 200 μm or more, the Young's modulus in the thickness direction of the bonding material layer is high.

In a joined body of the present invention, assuming that the thickness of the bonding material layer formed between a first member and a second member which are adjacent each other via the bonding material layer is taken as "t", that a portion of the bonding material layer from the interface between the first member and the bonding material layer to 0.25 t in a thickness direction is defined as a bonding material layer I, that a portion of the bonding material layer from the interface between the second member and the bonding material layer to 0.25 t in a thickness direction is defined as a bonding material layer III, and that a portion of the bonding material layer having a thickness of 0.5 t between the bonding material layer I and the bonding material layer III is defined as a bonding material layer II, an average porosity $\epsilon_1$ of the bonding material layer I and the bonding material layer III and a porosity $\epsilon_2$ of the bonding material layer II satisfy the relation of preferably $\epsilon_2/\epsilon_1 > 1.1$, more preferably $\epsilon_2/\epsilon_1 > 1.15$, and furthermore preferably $\epsilon_2/\epsilon_1 > 1.2$.

This means that more pores are present in the central portion in the thickness direction of the bonding material layer. Such distribution conditions of pores lower the Young's modulus in the thickness direction of the bonding material layer to enhance thermal stress-relaxing performance of the joined body.

Such distribution conditions of pores can be obtained with no particular operation as long as the compounding ratio of each of the materials constituting the bonding material composition is within a suitable range as described above with bonding by a general bonding method and a general drying method. It is possible to intentionally obtain the distribution conditions of pores as described above by a technique where particles or the like removable by combustion by a thermal treatment, extraction by a solvent, or the like are allowed to be contained in the bonding material composition so that the particles may be removed by the above means after bonding, drying, or a thermal treatment.

In a joined body of the present invention, the compressive Young's modulus in the thickness direction of the bonding material layer is preferably 20% or less, more preferably 15% or less, and furthermore preferably 10% or less of the Young's modulus of the members to be joined. When the Young's modulus is above 20%, thermal stress upon practical use cannot be released, and therefore a crack is prone to be caused in a product.

The "compressive Young's modulus in the thickness direction of the bonding material layer" is a value obtained by calculating from a stress-stain line chart obtained by cutting out a part (e.g., 10×10×1 mm) of the bonding material layer from the joined body as a test piece and measuring a displacement at the time of loading a predetermined compressive load to the test piece. The "Young's modulus of the members to be joined" is a value calculated from a load-displacement curve in a three-point bending test according to JIS R1601.

In addition, when the two members and the bonding material layer bonding the members are cut out as a test piece and subjected to the bending test of bonding portion in sample specimen, a ratio of the bending Young's modulus in the bending test of bonding portion in sample specimen to the compressive Young's modulus in the thickness direction of the bonding material layer (bending Young's modulus/compressive Young's modulus) is within the range preferably from 0.8 to 20, more preferably from 0.9 to 18, furthermore preferably 1 to 16. When the ratio is below 0.8, thermal stress upon practical use cannot be relaxed, and therefore a crack is prone to be caused in a product. When the ratio is above 20, sufficient bonding strength cannot be obtained.

Figure 5:
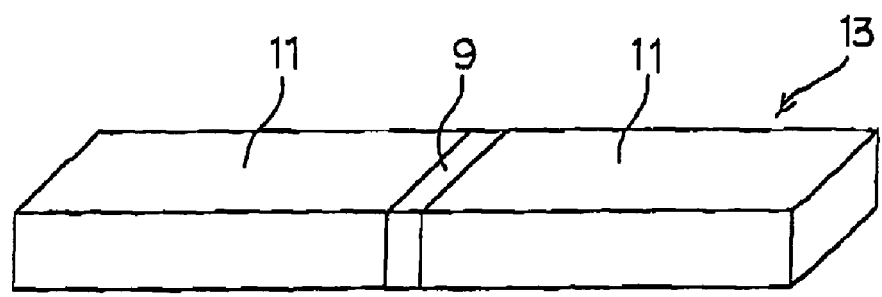
FIG. 5 is a perspective view showing an example of a test piece cut out from a joined body.
Figure 6:
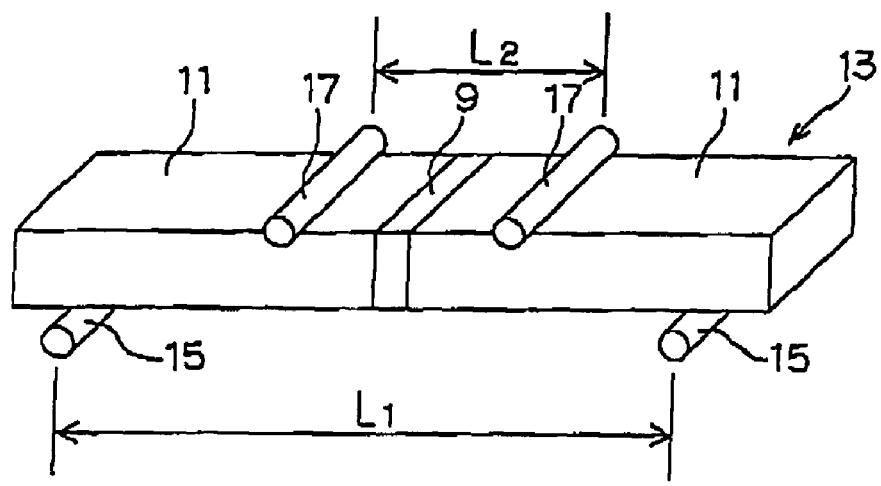
FIG. 6 is a perspective view showing a method of the four-point bending test.

Incidentally, the "bending Young's modulus in the bending test of bonding portion in sample specimen" is a value obtained according to JIS R 1624, as shown in FIG. 5, by cutting out a test piece (test piece having a structure where a bonding material layer of 10×15×1 mm is sandwiched by two members to be joined of 10×15×34.5 mm and 10×15×34.5 mm to give a test piece of 10×15×70 mm) 13, the test piece is subjected to a four-point bending test with a distance $L_1$ between two fulcrums 15 of 60 mm and a distance $L_2$ between two loading points 17, 17 of 20 mm to obtain a stress-strain curve and obtain an inclination thereof. This value is related to the compressive Young's modulus and the tensile Young's modulus in the thickness direction of the bonding material layer. When the "bending Young's modulus in the bending test of bonding portion in sample specimen" is higher than the aforementioned "compressive Young's modulus in the thickness direction of the bonding material layer", it is considered to be shown that the tensile Young's modulus in the thickness direction of the bonding material layer is higher than the compressive Young's modulus.

Further, in a joined body of the present invention, the bonding material layer has a thermal conductivity of preferably 0.05 to 5 W/ml, more preferably 0.1 to 4 W/mK, and furthermore preferably 0.2 to 3.5 W/mK. When the thermal conductivity is below 0.05 W/mK, high thermal stress generates upon practical use, and a crack is prone to be caused in a product. When it is above 5 W/mK, an abuse such as rise in the Young's modulus in the thickness direction of the bonding material layer may be caused.

Though the members to be joined constituting a joined body of the present invention are not particularly limited, ceramic members to obtain a ceramic structure are suitable members to be joined. Particularly, honeycomb segments to obtain a honeycomb structure are suitable for the members to be joined. A honeycomb structure obtained by joining such honeycomb segments can suitably be used for a diesel exhaust gas purification filter or the like, which is exposed to a severe thermal environment upon regenerating the filter.

In a method for manufacturing a joined body of the present invention, two or more members to be joined are unitarily joined by a bonding material composition of the present invention. Incidentally, when the members to be joined are joined by the use of a bonding material composition of the present invention, the bonding temperature is preferably 1000° C. or less (more preferably 50 to 900° C., and furthermore preferably 100 to 800° C.) from the viewpoint of exhibiting sufficient strength and bonding conditions. Though bonding can be performed with no problem even in the case of above 1000° C., desired characteristics (Young's modulus, thermal expansion coefficient, etc.) are hardly obtained.

Next, description will be given on the case that a joined body of the present invention is a honeycomb structure obtained by bonding a plurality of honeycomb segments (members to be joined) with specific examples of a constitution.

Figure 2:
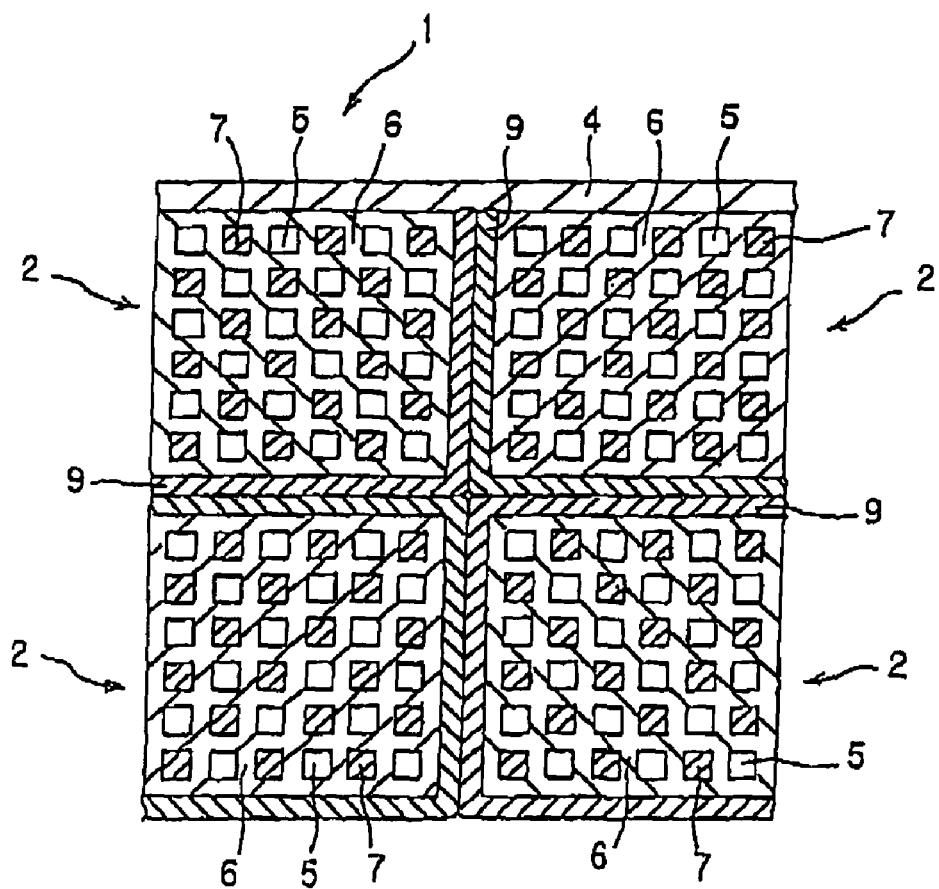
FIG. 2 is an enlarged view of the main part of an example of an embodiment of a joined body (honeycomb structure) of the present invention.

As shown in FIGS. 1 and 2, a honeycomb structure 1 has a structure having plurality of cells 5 functioning as fluid passages separated and formed by porous partition walls 6 and being disposed to be in parallel to one another in a direction of the central axis. Honeycomb segments 2 each of which constitutes a part of the whole structure and which are joined together in a direction perpendicular to the central axis of the honeycomb structure 1 to constitute the whole structure are unitarily joined by a bonding material layer 9 formed of a bonding material composition of the present invention to give a honeycomb segment joined body.

The honeycomb segments 2 unitarily joined by a bonding material layer 9 are subjected to grinding in such a manner that a cross-sectional shape of the entire body may have a circle, ellipse, triangle, square, or another desired shape after the joining, and the outer peripheral face is coated with a coating material 4. When the honeycomb structure 1 is used as a DPF, each of the cells 5 in a honeycomb segment 2 is alternately plugged with a filler 7 in one end portion as shown in FIG. 3 and FIG. 4 which is a cross-sectional view taken along the A-A line of the FIG. 3.

Figure 3:
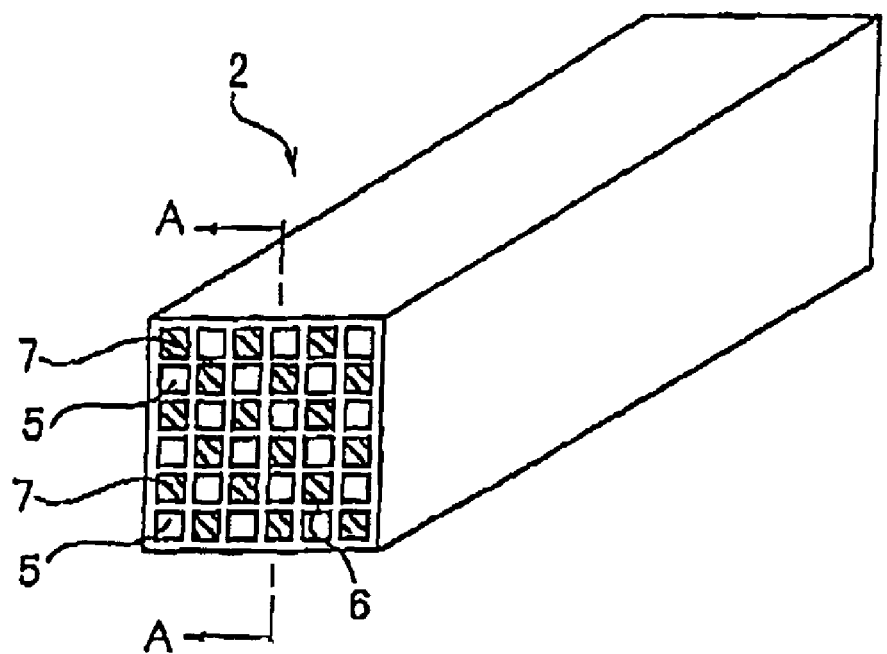
FIG. 3 is a perspective schematic view of members to be joined (honeycomb segments) constituting a joined body (honeycomb structure) of the present invention.
Figure 4:
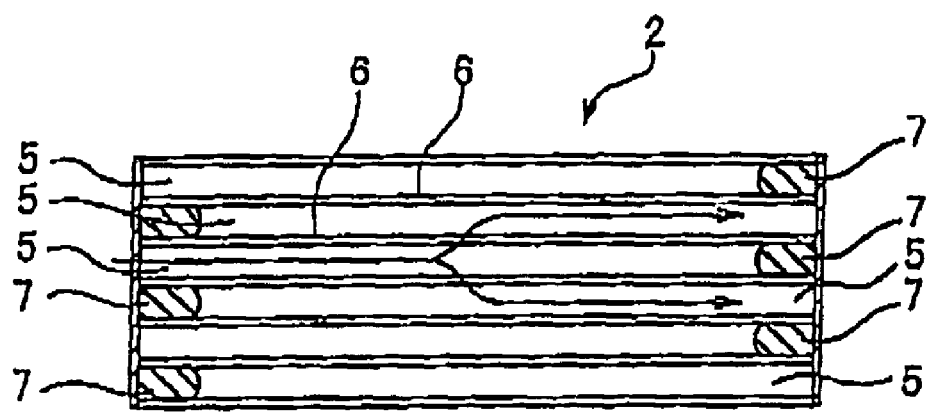
FIG. 4 is a cross-sectional view taken along the A-A line in FIG. 3.

A predetermined cell 5 (inflow cell) is open on the left end portion side in FIGS. 3 and 4 and plugged with a filler 7 on the right end portion side, and another cell 5 (outflow cell) adjacent to the above cell is plugged with a filler 7 on the left end portion side and open on the right end portion side. By such a plugging, as shown in FIG. 2, the end faces of the honeycomb segments 2 are made a checkered pattern alternately.

FIG. 4 shows a case where the exhaust gas inlet is on the left side of the honeycomb segment 2. Exhaust gas flows into the honeycomb segment 2 from the cells 5 (inflow cells) which are open without being plugged. The exhaust gas flowing into the cells 5 (inflow cells) passes through the porous partition walls 6 and flows out from other cells 5 (outflow cells). When the exhaust gas pass through the partition walls 6, particulate matter containing soot in exhaust gas is trapped by the partition walls 6. Thus, exhaust gas can be purified. Since a pressure loss increases due to accumulation of the particulate matter containing soot with the passage of time, a regeneration treatment to combust soot and the like is regularly performed. Though FIGS. 2 to 4 show a honeycomb segment 2 having a square entire cross-section, the shape may be a shape such as a triangle, hexagon, or the like. In addition, the cell 5 may have a cross-sectional shape of a triangle, hexagon, circle, ellipse, or another shape.

As shown in FIG. 2, the bonding material layer 9 is formed of a bonding material composition of the present invention and coated on the outer peripheral faces of the honeycomb segments 2 to join the honeycomb segments 2 together. Though, the bonding material layer 9 may be coated on the outer peripheral faces of each of the adjacent honeycomb segments 2, it may be coated on only one of the corresponding peripheral faces between two adjacent honeycomb segments 2. Such coating on only one of the corresponding faces is preferable in that the amount of the bonding material layer 9 to be used can be saved. The direction where the bonding material layer 9 is coated may be a longitudinal direction in an outer peripheral face of a honeycomb segment, a direction perpendicular to the longitudinal direction in an outer peripheral face of a honeycomb segment, a direction perpendicular to an outer peripheral face of a honeycomb segment, or the like and is not particularly limited. However, the direction is preferably toward the longitudinal direction of an outer peripheral face of the honeycomb segment. The thickness of the bonding material layer 9 is determined in consideration of bonding force between the honeycomb segments 2 and suitably selected within the range of, for example, 0.5 to 3.0 mm.

The material for the honeycomb segments 2 used in the present embodiment is constituted by at least one selected from the group consisting of silicon-silicon carbide-based composite materials formed by using silicon carbide (SiC) as aggregates and silicon (Si) as a bonding material, silicon nitride, cordierite, mullite, alumina, spinel, silicon carbide-cordierite-based composite materials, lithium aluminum silicate, aluminum titanate, and Fe—Cr—Al-based metals from the viewpoints of strength and thermal resistance. Of these, a material constituted by silicon carbide (Sic) or a silicon-silicon carbide based composite material is preferable.

The honeycomb segment 2 can be manufactured by adding a binder such as methyl cellulose, hydroxypropoxyl cellulose, hydroxyethyl cellulose, carboxymethyl cellulose, and polyvinyl alcohol, a pore former, a surfactant, and water or the like as a solvent to a material suitably selected from the aforementioned materials to obtain kneaded clay having plasticity; subjecting the kneaded clay to extrusion forming so as to give the aforementioned shape; drying the formed article by microwaves, hot air, or the like; and sintering the dried article.

The material for the filler 7 used for plugging the cells 5 may be the same material as that for the honeycomb segments 2. Plugging by the filler 7 can be performed by immersing an end face of the honeycomb segment 2 in a slurried filler in the state that the cells 5 to be unplugged are masked to fill the filler in the opening cells 5. Though the filler 7 may be filled before or after firing after forming the honeycomb segment 2, it may preferably be filled before firing because only one firing step is required.

After the honeycomb segments 2 are prepared as described above, a bonding material composition in the form of paste is applied on an outer peripheral face of each honeycomb segment 2 to form a bonding material layer 9. A plurality of honeycomb segments 2 are joined to form a predetermined shape (entire structure of the honeycomb structure 1) and subjected to press-fitting in this joined state, followed by heat-drying. Thus, a joined body having a plurality of honeycomb segments 2 unitarily joined together is manufactured. Then, the joined body is subjected to grinding into the aforementioned shape, and the outer peripheral faces are coated with a coating material 4, followed by heat-drying. Thus, a honeycomb structure 1 shown in FIG. 1 is manufactured. As a material for the coating material 4, a material similar to that for the bonding material layer 9 can be used. The thickness of the coating material 4 is suitably selected within the range from 0.1 to 1.5 mm.

EXAMPLE

The present invention will hereinbelow be described in more detail on the basis of Examples. However, the present invention is by no mean limited to these Examples.

Example 1

Manufacture of Honeycomb Segment (Member to be Joined)

As a raw material for a honeycomb segment, there was prepared having a plasticity by mixing a SiC powder and a metal Si powder at a mass ratio of 80 to 20 to give a mixture, and adding a pore former, an organic binder, a surfactant, and water to the mixture. The kneaded clay was subjected to extrusion forming and drying to obtain a honeycomb segment formed body having a partition wall thickness of 310 μm, a cell density of about 46.5 cells/$cm^2$ (300 cells/$in^2$), a square cross section of 35×35 mm, and a length of 152 mm. Plugging was performed on both the end faces of the honeycomb segment formed body in a checkered pattern, alternately. That is, plugging was performed in such a manner that adjacent cells were plugged on the opposite end portion. As the plugging material, the same material as the raw material for the honeycomb segment was used. After the plugging and drying, the binder was removed at about 400° C. under atmospheric condition, and the honeycomb segment was fired at about 1450° C. in an inert atmospheric condition of Ar to bond SiC crystal grains with Si. Thus, a honeycomb segment having a porous structure was obtained.

(Preparation of Bonding Material Composition)

With a mixture of flat particles, non-flat particles A, non-flat particles B, smectite mineral (smectite-based clay), an organic binder, and a resin balloon were further mixed an inorganic adhesive, a dispersant, and water, and kneading was performed for 30 minutes with a mixer to obtain paste-formed bonding material compositions (bonding material compositions No. 1 to 30) which were different from one another in the kinds and the composition ratio. At this time, the amount of water was adjusted so that the paste-formed bonding material compositions might have a viscosity of 20 to 60 Pa·s. Incidentally, calcined mica used as flat particles in the bonding material composition No. 16 was calcined at 800° C., and calcined talc used as flat particles in the bonding material composition No. 17 was calcined at 900° C. Ratios of the flat particles, non-flat particles A, non-flat particles B, smectite-based clay, and inorganic adhesive, which were the main components, are shown by mass % with respect to the total amount of the components as 100. Ratios of the organic binder, forming resin, and dispersant, which were the auxiliary components, were shown by mass % as a superaddition with respect to the total amount of the components as 100. The aspect ratio of the flat particles was calculated as the "longer diameter/thickness" of the particles. The "longer diameter" and the "thickness" were measured by observation with an electron microscope. That is, the thickness was measured by observing the flat particle from an arbitrary direction perpendicular to the direction of the thickness of the flat particle and image-processing the electron micrograph. In addition, the longer diameter was measured by image-processing the same image with a length perpendicular to a thickness direction of the particle being employed as a longer diameter. This measurement was carried out with respect to 10 or more particles selected at random from a vision of the observation, and the average value of the values of the aspect ratio was employed as the aspect ratio of the flat particles.

(Manufacture of Honeycomb Structure (Joined Body))

The bonding material composition No. 1 was coated on the outer wall faces of the honeycomb segment in a longitudinal direction of the honeycomb segment to form a bonding material layer, and another honeycomb segment was mounted thereon. The steps were repeated to obtain a honeycomb segment-layered body composed of 16 (4×4) honeycomb segments. After bonding all the segments by suitably applying pressure from outside, they were dried at 140° C. for two hours. After grinding the outer periphery of the honeycomb segment-joined body into a cylindrical shape, the outer peripheral face was coated with a coating material, which was then dried and cured at 700° C. for two hours to obtain a honeycomb structure.

(Evaluation on Bonding Material Layer of Joined Body)

With respect to the bonding material layer of the honeycomb structure obtained above, there were obtained the porosity, coarse pore diameter (pore diameter of the largest pore in the bonding material layer), $\epsilon_2/\epsilon_1$, ratio of the compressive Young's modulus in the thickness direction of the bonding material layer to the Young's modulus of the member to be joined, and ratio of the compressive Young's modulus of the bonding material layer to the Young's modulus in the bending test of bonding portion in sample specimen of the joined body according to the following methods. The results are shown in Table 2.

Porosity:

A part of the bonding material layer was cut out from the honeycomb structure to have an arbitrary shape (e.g., 10×10×1 mm), and the porosity was calculated by the Archimedes' method.

Observation of Micro Structure:

A part containing the bonding material layer was cut out from the honeycomb structure to have an arbitrary shape (e.g., 20×10×1 mm), and, in order to observe a cross section of the bonding material layer, a predetermined face was polished after being impregnated with a resin to obtain a face for observation. The face was observed with an electron microscope, and sizes of pores in the cross section of the bonding material layer, the state of distribution, and the like were observed. In addition, the bonding material layer was divided into four equal parts, and porosities of the points ($P_1$, $P_2$, $P_3$, and $P_4$ in order from the portion in contact with one segment (member A to be joined) toward the segment on the opposite side (member B to be joined)) were calculated by image analysis. From $\epsilon_1$ as the average of $P_1$ and $P_4$ and $\epsilon_2$ as the average of $P_2$ and $P_3$, a value of $\epsilon_2/\epsilon_1$ was calculated.

Compressive Young's Modulus;

A part containing the bonding material layer was cut out from the honeycomb structure to have an arbitrary shape (e.g., 10×10×1 mm) as a test piece, and a displacement of the test piece was measured when a predetermined compressive load was applied on the test piece, and the compressive Young's modulus was calculated from the stress-strain line chart (The Young's modulus of the members to be joined was calculated from a load-displacement curve in the three-point bending test according to JIS R1601).

Bending Young's Modulus in Bonding Bending Strength:

A test piece (e.g., 10×15×70 mm) of a joined body composed of two members to be joined and a bonding material layer was cut out according to JIS R1624 to obtain a stress-strain curve in a bending test. The inclination was defined as a bending Young's modulus in the bending test of bonding portion in sample specimen.

Thermal Conductivity:

A part of the bonding material layer of the honeycomb structure was cut out to have an arbitrary shape (e.g., 10×10×1 mm), and the thermal conductivity was measured according to JIS R1611.

(Evaluation on Honeycomb Structure)

The conditions of the obtained honeycomb structure after the members were joined were observed, and a rapid heating test (burner spalling test) was performed at 900° C. and 1000° C. by the following method. Crack generation conditions of the honeycomb structure after the test was observed. The results are shown in Table 3.

Burner Spalling Test (Rapid Heating Test):

This is a test for evaluating thermal shock resistance by temperature where a crack is not caused in the honeycomb structure (The higher the temperature is, the higher the thermal shock resistance is.) by sending air heated by a burner into the honeycomb structure to form a difference in temperature between the central portion and the outside portion. In Table 3, "bad" means that there was a crack caused at the test temperature of 900° C., "good" means that there was no crack caused at the test temperature of 900° C., and "excellent" means that there was no crack caused at the test temperature of 1000° C.

Examples 2 to 26, Comparative Examples 1 to 4

In Examples 2 to 26, the honeycomb structures were manufactured in the same manner as in Example 1 except that the bonding material composition No. 1 in Example 1 was replaced with the bonding material compositions Nos. 2 to 26 shown in Table 1. In Comparative Examples 1 to 4, the honeycomb structures were manufactured in the same manner as in Example 1 except that the bonding material composition No. 1 in Example 1 was replaced with the bonding material compositions Nos. 27 to 30 in Table 1. The honeycomb structures (Examples 2 to 26, Comparative Examples 1 to 4) were evaluated and tested in the same manner as in Example 1. The results are shown in Tables 2 and 3.

TABLE 1

| Bonding material composition No. | Flat particle Material & content (Material/mass %) | Aspect ratio | Average particle diameter (μm) | Non-flat particle A Material & content (Material/mass %) | Average particle diameter (μm) | Non-flat particle B Material & content (Material/mass %) | Average particle diameter (μm) |
|---|---|---|---|---|---|---|---|
| 1 | Mica/13.6 | 20 | 40 | Silicon carbide/24.1 | 100 | Silicon carbide/40.1 | 1.5 |
| 2 | Mica/19.9 | 20 | 40 | Silicon carbide/16.7 | 100 | Silicon carbide/40.8 | 1.5 |
| 3 | Mica/30.2 | 20 | 40 | Silicon carbide/5.5 | 100 | Silicon carbide/41.4 | 1.5 |
| 4 | Mica/20.0 | 20 | 40 | Silicon carbide/16.9 | 100 | Silicon carbide/40.7 | 1.5 |
| 5 | Mica/21.3 | 20 | 40 | Silicon carbide/17.9 | 100 | Silicon carbide/36.5 | 1.5 |
| 6 | Mica/18.1 | 20 | 40 | Silicon carbide/15.3 | 100 | Silicon carbide/43.4 | 1.5 |
| 7 | Mica/20.4 | 20 | 40 | Silicon carbide/17.2 | 100 | Silicon carbide/42.0 | 1.5 |
| 8 | Mica/19.9 | 13 | 40 | Silicon carbide/16.7 | 100 | Silicon carbide/40.8 | 1.5 |
| 9 | Mica/19.9 | 25 | 40 | Silicon carbide/16.7 | 100 | Silicon carbide/40.8 | 1.5 |
| 10 | Mica/19.9 | 20 | 20 | Silicon carbide/16.7 | 100 | Silicon carbide/40.8 | 1.5 |
| 11 | Mica/19.9 | 20 | 50 | Silicon carbide/16.7 | 100 | Silicon carbide/40.8 | 1.5 |
| 12 | Talc/20.4 | 6 | 20 | Silicon carbide/16.6 | 100 | Silicon carbide/40.5 | 1.5 |
| 13 | Talc/20.4 | 6 | 40 | Silicon carbide/16.6 | 100 | Silicon carbide/40.5 | 1.5 |
| 14 | Glass flake/19.3 | 22 | 40 | Silicon carbide/16.9 | 100 | Silicon carbide/41.1 | 1.5 |
| 15 | Glass flake/19.3 | 22 | 160 | Silicon carbide/16.9 | 100 | Silicon carbide/41.1 | 1.5 |
| 16 | Calcined mica/19.9 | 20 | 40 | Silicon carbide/16.7 | 100 | Silicon carbide/40.8 | 1.5 |
| 17 | Calcined talc/20.4 | 6 | 20 | Silicon carbide/16.6 | 100 | Silicon carbide/40.5 | 1.5 |
| 18 | Mica/19.1 | 20 | 40 | Alumina/20.1 | 30 | Silicon carbide/39.2 | 1.5 |
| 19 | Mica/20.5 | 20 | 40 | Silica/14.0 | 40 | Silicon carbide/42.1 | 1.5 |
| 20 | Mica/19.9 | 20 | 40 | Mullite/16.7 | 15 | Silicon carbide/40.8 | 1.5 |
| 21 | Mica/17.3 | 20 | 40 | Zirconia/27.4 | 30 | Silicon carbide/35.6 | 1.5 |
| 22 | Mica/20.5 | 20 | 40 | Glass/14.0 | 100 | Silicon carbide/42.1 | 1.5 |
| 23 | Mica/17.4 | 20 | 40 | Alumina/18.3 | 30 | Alumina/44.6 | 2 |
| 24 | Mica/18.0 | 20 | 40 | Silicon carbide/15.2 | 100 | Alumina/46.3 | 2 |
| 25 | Mica/19.9 | 20 | 40 | Silicon carbide/16.7 | 100 | Silicon nitride/40.8 | 1 |
| 26 | Mica/19.6 | 20 | 40 | Silicon carbide/16.5 | 100 | Aluminum nitride/41.6 | 1 |
| 27 | — | — | — | Fiber/34.9 | 150 | Silicon carbide/41.9 | 1.5 |
| 28 | — | — | — | Silicon carbide/38.8 | 100 | Silicon carbide/39.4 | 1.5 |
| 29 | Mica/75.2 | 20 | 40 | — | — | — | — |
| 30 | Mica/20.1 | 20 | 40 | Silicon carbide/17.0 | 100 | Silicon carbide/40.8 | 1.5 |

| Bonding material composition No. | Smectite mineral (Material/mass %) | Inorganic adhesive (Material/mass %) | Organic binder (Material/mass %)* | Foaming resin (mass %)* | Dispersant (mass %)* |
|---|---|---|---|---|---|
| 1 | Bentonite/0.5 | Colloidal silica/21.7 | CMC/0.4 | 1.5 | 0.04 |
| 2 | Bentonite/0.5 | Colloidal silica/22.1 | CMC/0.4 | 1.5 | 0.04 |
| 3 | Bentonite/0.5 | Colloidal silica/22.4 | CMC/0.4 | 1.5 | 0.04 |
| 4 | Bentonite/0.25 | Colloidal silica/22.2 | CMC/0.4 | 1.5 | 0.04 |

TABLE 1-continued

|   |   |   |   |   |   |
|---|---|---|---|---|---|
| 5 | Bentonite/0.75 | Colloidal silica/23.6 | CMC/0.4 | 1.5 | 0.04 |
| 6 | Bentonite/0.5 | Colloidal silica/22.7 | CMC/0.4 | 1.5 | 0.04 |
| 7 | Bentonite/0.5 | Colloidal silica/19.9 | CMC/0.4 | 1.5 | 0.04 |
| 8 | Bentonite/0.5 | Colloidal silica/22.1 | CMC/0.4 | 1.5 | 0.04 |
| 9 | Bentonite/0.5 | Colloidal silica/22.1 | CMC/0.4 | 1.5 | 0.04 |
| 10 | Bentonite/0.5 | Colloidal silica/22.1 | CMC/0.4 | 1.5 | 0.04 |
| 11 | Bentonite/0.5 | Colloidal silica/22.1 | CMC/0.4 | 1.5 | 0.04 |
| 12 | Bentonite/0.5 | Colloidal silica/21.9 | CMC/0.4 | 1.5 | 0.04 |
| 13 | Bentonite/0.5 | Colloidal silica/21.9 | CMC/0.4 | 1.5 | 0.04 |
| 14 | Bentonite/0.5 | Colloidal silica/22.3 | CMC/0.4 | 1.5 | 0.04 |
| 15 | Bentonite/0.5 | Colloidal silica/22.3 | CMC/0.4 | 1.5 | 0.04 |
| 16 | Bentonite/0.5 | Colloidal silica/22.1 | CMC/0.4 | 1.5 | 0.04 |
| 17 | Bentonite/0.5 | Colloidal silica/21.9 | CMC/0.4 | 1.5 | 0.04 |
| 18 | Bentonite/0.5 | Colloidal silica/21.2 | CMC/0.4 | 1.5 | 0.04 |
| 19 | Bentonite/0.5 | Colloidal silica/22.8 | CMC/0.4 | 1.5 | 0.04 |
| 20 | Bentonite/0.5 | Colloidal silica/22.1 | CMC/0.4 | 1.5 | 0.04 |
| 21 | Bentonite/0.5 | Colloidal silica/19.3 | CMC/0.4 | 1.5 | 0.04 |
| 22 | Bentonite/0.5 | Colloidal silica/22.8 | CMC/0.4 | 1.5 | 0.04 |
| 23 | Bentonite/0.5 | Colloidal silica/19.3 | CMC/0.4 | 1.5 | 0.04 |
| 24 | Bentonite/0.5 | Colloidal silica/20.1 | CMC/0.4 | 1.5 | 0.04 |
| 25 | Bentonite/0.5 | Colloidal silica/22.1 | CMC/0.4 | 1.5 | 0.04 |
| 26 | Bentonite/0.5 | Colloidal silica/21.8 | CMC/0.4 | 1.5 | 0.04 |
| 27 | Bentonite/0.5 | Colloidal silica/22.7 | CMC/0.4 | 1.5 | 0.04 |
| 28 | Bentonite/0.5 | Colloidal silica/21.3 | CMC/0.4 | 1.5 | 0.04 |
| 29 | Bentonite/0.5 | Colloidal silica/24.3 | CMC/0.4 | 1.5 | 0.04 |
| 30 | — | Colloidal silica/22.1 | CMC/0.4 | 1.5 | 0.04 |

*mass % of superaddition with respect to the total amount of the components (flat particles, non-flat particles A, non-flat particles B, smeclite mineral, Inorganic adhesive) as 100

TABLE 2

|   | Bonding material composition No. | Porosity (%) | Coarse pore diameter (μm) | $c_g/e_1$ | Compressive Young's modulus in thickness direction of bonding material layer/Young's modulus of member to be joined | Compressive Young's modulus of bonding material layer/Young's modulus in bending test of bonding portion in sample specimen of joined body (%) | Thermal conductivity of bonding material layer (W/mK) |
|---|---|---|---|---|---|---|---|
| Example 1 | 1 | 58 | 400 | 1.24 | 1.8 | 11 | 1.0 |
| Example 2 | 2 | 59 | 500 | 1.25 | 1.1 | 10 | 0.9 |
| Example 3 | 3 | 62 | 600 | 1.26 | 1.0 | 8 | 0.6 |
| Example 4 | 4 | 57 | 250 | 1.15 | 2.3 | 20 | 0.9 |
| Example 5 | 5 | 60 | 800 | 1.38 | 1.0 | 7 | 0.3 |
| Example 6 | 6 | 57 | 500 | 1.20 | 1.2 | 12 | 0.6 |
| Example 7 | 7 | 60 | 400 | 1.19 | 1.1 | 9 | 0.6 |

TABLE 2-continued

| | Bonding material composition No. | Porosity (%) | Coarse pore diameter (μm) | $c_g/e_1$ | Compressive Young's modulus in thickness direction of bonding material layer/ Young's modulus of member to be joined (%) | Compressive Young's modulus of bonding material layer/ Young's modulus in bending test of bonding portion in sample specimen of joined body (%) | Thermal conductivity of bonding material layer (W/mK) |
|---|---|---|---|---|---|---|---|
| Example 8 | 8 | 56 | 300 | 1.21 | 2.0 | 16 | 0.8 |
| Example 9 | 9 | 61 | 550 | 1.25 | 1.3 | 12 | 0.8 |
| Example 10 | 10 | 57 | 300 | 1.20 | 1.9 | 17 | 0.8 |
| Example 11 | 11 | 62 | 500 | 1.26 | 1.3 | 11 | 1.0 |
| Example 12 | 12 | 53 | 200 | 1.19 | 1.8 | 18 | 0.5 |
| Example 13 | 13 | 56 | 300 | 1.25 | 1.2 | 10 | 0.7 |
| Example 14 | 14 | 59 | 500 | 1.24 | 1.2 | 11 | 0.6 |
| Example 15 | 15 | 63 | 950 | 1.40 | 1.9 | 8 | 0.3 |
| Example 16 | 16 | 57 | 500 | 1.23 | 1.2 | 11 | 0.9 |
| Example 17 | 17 | 50 | 200 | 1.18 | 1.8 | 16 | 0.6 |
| Example 18 | 18 | 60 | 600 | 1.25 | 1.4 | 10 | 0.7 |
| Example 19 | 19 | 58 | 500 | 1.23 | 1.0 | 9 | 0.5 |
| Example 20 | 20 | 57 | 400 | 1.22 | 1.3 | 11 | 0.4 |
| Example 21 | 21 | 58 | 350 | 1.2 | 1.5 | 13 | 0.4 |
| Example 22 | 22 | 61 | 800 | 1.26 | 1.0 | 10 | 0.3 |
| Example 23 | 23 | 59 | 800 | 1.25 | 1.3 | 13 | 0.3 |
| Example 24 | 24 | 59 | 500 | 1.23 | 1.3 | 12 | 0.5 |
| Example 25 | 25 | 57 | 450 | 1.25 | 1.2 | 11 | 0.8 |
| Example 26 | 26 | 61 | 450 | 1.28 | 1.1 | 9 | 0.7 |
| Comp. Ex. 1 | 27 | 50 | 700 | 1.32 | 1.0 | 50 | 0.4 |
| Comp. Ex. 2 | 28 | 60 | 100 | 1.03 | 5.2 | 18 | 1.4 |
| Comp. Ex. 3 | 29 | 61 | 150 | 1.15 | 5.9 | 36 | 0.3 |
| Comp. Ex. 4 | 30 | 59 | 100 | 1.05 | 5.3 | 39 | 1.1 |

TABLE 3

| Example | Bonding material composition No. | State after joining | Crack in end portion | Crack in outer peripheral portion | Crack in bonding material layer |
|---|---|---|---|---|---|
| Example 1 | 1 | Good | Excellent | Good | Good |
| Example 2 | 2 | Good | Excellent | Excellent | Excellent |
| Example 3 | 3 | Good | Excellent | Excellent | Excellent |
| Example 4 | 4 | Good | Excellent | Good | Excellent |
| Example 5 | 5 | Good | Excellent | Excellent | Good |
| Example 6 | 6 | Good | Good | Excellent | Excellent |
| Example 7 | 7 | Good | Excellent | Excellent | Good |
| Example 8 | 8 | Good | Excellent | Excellent | Good |
| Example 9 | 9 | Good | Excellent | Excellent | Excellent |
| Example 10 | 10 | Good | Excellent | Excellent | Good |
| Example 11 | 11 | Good | Excellent | Excellent | Excellent |
| Example 12 | 12 | Good | Good | Good | Good |
| Example 13 | 13 | Good | Good | Excellent | Excellent |
| Example 14 | 14 | Good | Excellent | Excellent | Excellent |
| Example 15 | 15 | Good | Excellent | Excellent | Good |
| Example 16 | 16 | Good | Excellent | Excellent | Excellent |
| Example 17 | 17 | Good | Good | Good | Good |
| Example 18 | 18 | Good | Excellent | Good | Excellent |
| Example 19 | 19 | Good | Excellent | Excellent | Good |
| Example 20 | 20 | Good | Excellent | Excellent | Good |
| Example 21 | 21 | Good | Good | Good | Excellent |
| Example 22 | 22 | Good | Excellent | Good | Good |
| Example 23 | 23 | Good | Good | Good | Good |
| Example 24 | 24 | Good | Excellent | Good | Excellent |
| Example 25 | 25 | Good | Excellent | Excellent | Good |
| Example 26 | 26 | Good | Excellent | Excellent | Good |
| Comp. Ex. 1 | 27 | Good | Bad | Excellent | Excellent |
| Comp. Ex. 2 | 28 | Good | Good | Bad | Bad |
| Comp. Ex. 3 | 29 | Some cracks | Good | Bad | Bad |
| Comp. Ex. 4 | 30 | Good | Good | Bad | Bad |

(Discussion)

From the results of Tables 2 and 3, the Examples 1 to 26 of the present invention have good evaluations on the bonding material compositions (bonding material layers) and good bonding conditions between honeycomb segments. In addition, even after a rapid heating test, no crack generated in the end portions, the outer peripheral portion, and the bonding material layer of the honeycomb structure, and thereby good products were obtained. On the other hand, in Comparative Example 1, which employed a bonding material composition containing fibers in place of flat particles as a filler, the ratio of the compressive Young's modulus of the bonding material layer to the Young's modulus in the bending test of bonding portion in sample specimen of the joined body was high, and a crack was caused in an end portion of a honeycomb structure after the rapid heating test. In Comparative Example 2, which employed a bonding material composition containing no flat particle, the ratio of the compressive Young's modulus in the thickness direction of the bonding material layer to the Young's modulus of the members to be joined was high, and cracks were caused in the outer peripheral portion and the bonding material layer of the honeycomb structure after the rapid heating test. In Comparative Example 3, which employed a bonding material composition containing no non-flat particles, and in Comparative Example 4, which employed a bonding material composition containing no smectite mineral, both the ratio of the compressive Young's modulus of the bonding material layer to the Young's modulus in the bending test of bonding portion in sample specimen of the joined body and the ratio of the compressive Young's modulus in the thickness direction of the bonding material layer to the Young's modulus of the members to be joined were high, and cracks were caused in the outer peripheral portion and the bonding material layer of the honeycomb structure after the rapid heating test.

INDUSTRIAL APPLICABILITY

The present invention can suitably be used in manufacturing a joined body obtained by unitarily joining a plurality of members to be joined, for example, a honeycomb structure obtained by unitarily joining a plurality of honeycomb segments and used for a DPF, or the like.

What is claimed is:

1. A bonding material composition for obtaining a joined body by unitarily joining two or more members to be joined by means of a bonding material layer, wherein the bonding material composition contains flat particles, non-flat particles, smectite-based clay, and an inorganic adhesive as main components, wherein
the bonding material composition does not contain fibers,
the non-flat particles contained in the bonding material composition comprise non-flat particles A having an average particle diameter of 10 μm or more and non-flat particles B having an average particle diameter of below 10 μm, and
the bonding material composition contains 30 to 50% by mass of the non-flat particles B with respect to the total amount of the main components.

2. A bonding material composition according to claim 1, wherein the bonding material composition contains 12 to 38% by mass of the flat particles with respect to the total amount of the main components.

3. A bonding material composition according to claim 1, wherein the bonding material composition contains 0.1 to 5% by mass of the smectite-based clay with respect to the total amount of the main components.

4. A bonding material composition according to claim 1, wherein the bonding material composition further contains an organic binder, a dispersant, a resin balloon, and water as auxiliary components.

5. A bonding material composition according to claim 1, wherein the flat particles have an aspect ratio of 3 or more.

6. A bonding material composition according to claim 5, wherein the flat particles have an average particle diameter of 2 to 200 μm.

7. A bonding material composition according to claim 5, wherein the flat particles are formed of at least one material selected from the group consisting of mica, talc, boron nitride, and glass flakes.

8. A bonding material composition according to claim 7, wherein the mica is one calcined at 800° C. or more, and the talc is one calcined at 900° C. or more.

9. A bonding material composition according to claim 1, wherein the non-flat particles are formed of at least one material selected from the group consisting of alumina, silica, mullite, zirconia, silicon carbide, silicon nitride, aluminum nitride, and glass.

10. A bonding material composition according to claim 1, wherein the inorganic adhesive is of colloidal silica.

11. A bonding material composition according to claim 1, wherein the members are honeycomb segments.

12. A bonding material composition according to claim 11, wherein the honeycomb segments are to be used for obtaining a honeycomb structure as a diesel exhaust gas purification filter.

13. A joined body formed by unitarily joining two or more members to be joined by means of a bonding material layer formed of a bonding material composition according to claim 1, wherein the bonding material layer has a porosity of 40 to 80% and pores having a pore diameter of 200 μm or more.

14. A joined body according to claim 13, wherein two members adjacent each other are bonded together by means of the bonding material layer having a thickness of t, and, when a portion of the bonding material layer from the interface between a first member of said two members and the bonding material layer to 0.25 t in a thickness direction is defined as a bonding material layer I, a portion of the bonding material layer from the interface between a second member of said two members and the bonding material layer to 0.25 t in a thickness direction is defined as a bonding material layer III, and a portion of the bonding material layer having a thickness of 0.5 t between the bonding material layer I and the bonding material layer III is defined as a bonding material layer II, an average porosity $\epsilon1$ of the bonding material layer I and the bonding material layer III and a porosity $\epsilon2$ of the bonding material layer II satisfy the relation of $\epsilon2/\epsilon1>1.1$.

15. A joined body according to claim 13, wherein a compressive Young's modulus in a thickness direction of the bonding material layer is 20% or less of a Young's modulus of the members to be joined.

16. A joined body according to claim 13, wherein, when the two members and the bonding material layer bonding the members are cut out as a test piece and subjected to a bending test of bonding portion in sample specimen, a ratio of a bending Young's modulus in the bending test of bonding portion in sample specimen to a compressive Young's modulus in a thickness direction of the bonding material layer is within the range from 0.8 to 20.

17. A joined body according to claim 13, wherein the bonding material layer has a thermal conductivity of 0.05 to 5 W/mK.

18. A joined body according to claim 13, wherein the members to be joined are honeycomb segments.

19. A joined body according to claim 13, wherein the joined body is used for a diesel exhaust gas purification filter.

20. A method for manufacturing a bonding material composition, the method comprising the step of mixing and kneading a raw material containing, flat particles, non-flat particles, smectite-based clay, and an inorganic adhesive as main components to give a paste, wherein
the bonding material composition does not contain fibers,
the non-flat particles contained in the bonding material composition comprise non-flat particles A having an average particle diameter of 10 μm or more and non-flat particles B having an average particle diameter of below 10 μm, and
the bonding material composition contains 30 to 50% by mass of the non-flat particles B with respect to the total amount of the main components.

21. A method for manufacturing a bonding material composition according to claim 20, wherein the raw material further contains an organic binder, a dispersant, a resin balloon, and water as auxiliary components.

22. A method for manufacturing a joined body formed by unitarily joining two or more members to be joined by using a bonding composition according to claim 1.

23. A method for manufacturing a joined body according to claim 22, wherein the members to be joined are honeycomb segments.

* * * * *